(12) United States Patent
Frick

(10) Patent No.: US 10,387,356 B1
(45) Date of Patent: Aug. 20, 2019

(54) GENERATING TIMESTAMPS ON A PACKET-ORIENTED BUS

(71) Applicant: Teradyne, Inc., North Reading, MA (US)

(72) Inventor: Lloyd K. Frick, Pepperell, MA (US)

(73) Assignee: Teradyne, Inc., North Reading, MA (US)

( * ) Notice: Subject to any disclaimer, the term of this patent is extended or adjusted under 35 U.S.C. 154(b) by 0 days.

(21) Appl. No.: 16/149,586

(22) Filed: Oct. 2, 2018

(51) Int. Cl.
G06F 13/42 (2006.01)
H04L 12/40 (2006.01)
G06F 13/40 (2006.01)

(52) U.S. Cl.
CPC ...... G06F 13/4221 (2013.01); G06F 13/4022 (2013.01); H04L 12/40071 (2013.01); G06F 2213/0026 (2013.01)

(58) Field of Classification Search
CPC ......... H04L 12/40071; H04L 12/40091; G06F 2213/0012; G06F 2213/0026
See application file for complete search history.

(56) References Cited

U.S. PATENT DOCUMENTS

| 8,310,270 | B2 | 11/2012 | Gohel et al. |
| 8,701,130 | B2 | 4/2014 | Frick |
| 8,745,337 | B2 | 6/2014 | Frick et al. |
| 8,914,566 | B2 | 12/2014 | Vandervalk et al. |
| 9,759,772 | B2 | 9/2017 | Kaushansky et al. |
| 9,996,484 | B1 * | 6/2018 | Davis .................... G06F 13/105 |
| 2009/0172310 | A1 | 7/2009 | Frick et al. |
| 2010/0077111 | A1 * | 3/2010 | Holmes ............. H04L 12/40013 710/33 |
| 2013/0003757 | A1 * | 1/2013 | Boatright .............. H04J 3/0697 370/474 |
| 2013/0110445 | A1 | 5/2013 | Kaushansky et al. |
| 2013/0111505 | A1 | 5/2013 | Frick et al. |
| 2017/0093677 | A1 * | 3/2017 | Skerry .................... H04L 43/12 |
| 2017/0111295 | A1 * | 4/2017 | Snowdon ................ G06F 13/00 |
| 2018/0034749 | A1 * | 2/2018 | Shirlen ............... H04L 47/6245 |

OTHER PUBLICATIONS

Teradyne, High Performance & High Density PXI Express Instrument for Mil-FireWire Applications, HSSub-6120 AS5643 Mil-FireWire, 2 pages (2016).
Teradyne, Multiple Module Serial Bus Test Instrument, Bi4-Series Bus Test Instruments, 2 pages (2015).

(Continued)

*Primary Examiner* — Glenn A. Auve
(74) *Attorney, Agent, or Firm* — Choate, Hall & Stewart LLP

(57) ABSTRACT

An example method is performed on a packet-oriented bus at a point between a source of a data packet and a destination of a data packet. The example method includes detecting a format of the data packet on the packet-oriented bus; determining a time at which the data packet was detected; generating a timestamp report containing the time, with the timestamp report being addressed to a device connected to the packet-oriented bus; and outputting the timestamp report to the device. Detecting, determining, generating, and outputting are performed by digital logic connected to the packet-oriented bus.

22 Claims, 6 Drawing Sheets

(56) References Cited

OTHER PUBLICATIONS

Teradyne, Teradyne Introduces First Commercial 1394B Test Instrument to Meet All F-35 Joint Strike Fighter Requirements, Business Wire, 3 pages (Sep. 23, 2003). URL: https://www.businesswire.com/news/home/20030923005021/en/Teradyne-Introduces-Com (Retrieved Oct. 2, 2018).

United Electronic Industries, Inc. DNA/DNR-ARINC-708/453 Communications Interface with 2TX and 2RX Channels, User Manual, Jan. 2011 Edition, Version 1.0, 30 pages (1998-2011).

* cited by examiner

FIG. 5

GENERATING TIMESTAMPS ON A PACKET-ORIENTED BUS

TECHNICAL FIELD

This specification relates generally to generating timestamps on a packet-oriented bus, such as a peripheral component interconnect express (PCIe) bus.

BACKGROUND

A packet-oriented bus includes data buses that transmit data between devices in the form of packets. PCIe is an example of a packet-oriented bus. PCIe is a serial bus that includes, among other things, a switch fabric to control point-to-point serial connections between devices. PCIe also includes a root complex device to connect a microprocessor and memory to the PCIe switch fabric. In some systems, the microprocessor executes software to determine times at which events occur on the PCIe bus. For example, in response to a processor interrupt, the software determines the time that an event occurred and records that time.

SUMMARY

An example method for generating timestamps on a packet-oriented bus is performed on the packet-oriented bus at a point between a source of a data packet and a destination of a data packet. The example method includes detecting a format of the data packet on the packet-oriented bus; determining a time at which the data packet was detected; generating a timestamp report containing the time, with the timestamp report being addressed to a device connected to the packet-oriented bus; and outputting the timestamp report to the device. Detecting, determining, generating, and outputting are performed by digital logic connected to the packet-oriented bus. The example method may include one or more of the following features, either alone or in combination.

The device to which the timestamp report is addressed may be or include a microprocessor. The digital logic may be located on a second device connected to the packet-oriented bus that is separate from the microprocessor. The digital logic may be or include a field-programmable gate array (FPGA). The FPGA may be connected to the packet-oriented bus between the microprocessor and a third device that output the data packet. The packet-oriented bus may be or include a PCIe bus. The third device may interface to an IEEE 1394 bus. The IEEE bus may be located on a path to a device under test.

The device to which the timestamp report is addressed is a first device. The data packet may be output from a second device connected to the packet-oriented bus to a third device connected to the packet-oriented bus. The digital logic may be on a path of the packet-oriented bus between the second device and the third device. The first device may be or include a microprocessor.

The packet-oriented bus may be or include a PCIe bus. The digital logic may be located at a root complex of the PCIe bus. Detecting the format may include detecting that the data packet is a write packet. The write packet may be for writing to one or more predefined addresses. The device to which the timestamp report is addressed may be or include a microprocessor. Receipt of the write packet my trigger or produce an interrupt for the microprocessor.

The device to which the timestamp report is addressed is a first device. The data packet may be output from a second device connected to the packet-oriented bus. The timestamp report may be output to memory on the first device. The timestamp report may be used in testing operation a device under test in communication with the second device.

The time may be determined by referencing a clock available on the packet-oriented bus. The timestamp report may be output to the device—such as the microprocessor— over the packet-oriented bus.

An example system for generating timestamps on a packet-oriented bus includes the packet-oriented bus; a first device connected to the packet-oriented bus for outputting a data packet over the packet-oriented bus; and digital logic connected to the packet-oriented bus. The digital logic is configured to perform operations that include detecting a format of the data packet on the packet-oriented bus; determining a time at which the data packet was detected; generating a timestamp report containing the time, with the timestamp report being addressed to a second device; and outputting the timestamp report to the second device over the packet-oriented bus. The digital logic is connected to the packet-oriented bus at a point between the first device and a destination of a data packet. The example system may include one or more of the following features, either alone or in combination.

The second device to which the timestamp report is addressed may be or include a microprocessor. The digital logic is located on a third device connected to the packet-oriented bus that is separate from the microprocessor. The digital logic may be or include a field-programmable gate array (FPGA). The third device may be connected to the packet-oriented bus between the microprocessor and the first device. The packet-oriented bus may be or include a PCIe bus. The first device may interface to an IEEE 1394 bus. The IEEE bus may be located on a path to a device under test.

The destination may be the second device connected to the packet-oriented bus. The digital logic may be on a path of the packet-oriented bus between the first device and the second device. The second device to which the timestamp report is addressed may be or include a microprocessor.

The packet-oriented bus may be or include a PCIe bus. The digital logic may be located at a root complex of the PCIe bus. Detecting the format may include detecting that the data packet is a write packet. The write packet may be for writing to one or more predefined addresses. The second device to which the timestamp report is addressed may be or include a microprocessor. Receipt of the write packet may trigger or produce an interrupt for the microprocessor.

The timestamp report may be addressed to memory on the second device. The system may be part of a test instrument configured to use the timestamp in testing operation of a device under test in communication with the first device.

The time may be determined by referencing a clock available on the packet-oriented bus. The timestamp report may be output to the second device over the packet-oriented bus.

Example automatic test equipment includes a device interface board for interfacing to a device under test; and a test head comprising one or more test instruments. At least one of the test instruments includes an example system for generating timestamps on a packet-oriented bus includes the packet-oriented bus; a first device connected to the packet-oriented bus for outputting a data packet over the packet-oriented bus; and digital logic connected to the packet-oriented bus. The digital logic is configured to perform operations that include detecting a format of the data packet on the packet-oriented bus; determining a time at which the data packet was detected; generating a timestamp report containing the time, with the timestamp report being addressed to a second device; and outputting the timestamp report to the second device over the packet-oriented bus. The digital logic is connected to the packet-oriented bus at a point between the first device and a destination of a data packet. A data bus that is different from the packet-oriented bus is on a path between the first device and the device interface board.

Any two or more of the features described in this specification, including in this summary section, can be combined to form implementations not specifically described herein.

The systems and processes described herein, or portions thereof, can be implemented using/controlled by a computer program product that includes instructions that are stored on one or more non-transitory machine-readable storage media, and that are executable on one or more processing devices to control (e.g., coordinate) the operations described herein. The systems and processes described herein, or portions thereof, can be implemented as an apparatus, method, or electronic system that can include one or more processing devices and memory to store executable instructions to implement various operations.

The details of one or more implementations are set forth in the accompanying drawings and the description below. Other features, objects, and advantages will be apparent from the description and drawings, and from the claims.

DESCRIPTION OF THE DRAWINGS

FIG. 5 is a diagram of an example generic PCIe write packet.

Like reference numerals in different figures indicate like elements.

DETAILED DESCRIPTION

Figure 1:
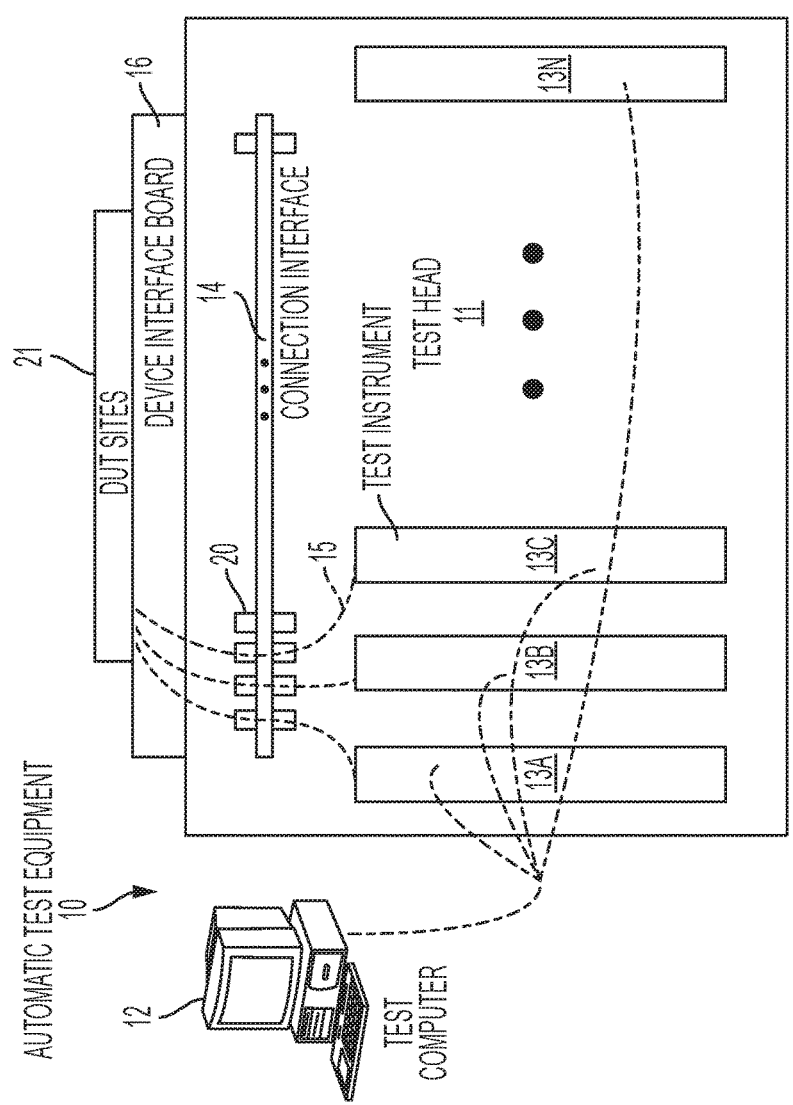
FIG. 1 is block diagram of an example test system.

Described herein are example techniques for generating timestamps on a packet-oriented bus. Techniques for generating timestamps are referred to "timestamping". The techniques are described in the context of a PCIe bus; however, they are applicable to any appropriate packet-oriented bus or other type of data bus.

An example system for generating timestamps on a packet-oriented bus is implemented by digital logic connected directly to a PCIe bus. The digital logic may reside on a root complex of the PCIe bus or on any other appropriate device or devices connected directly to the PCIe bus. In this regard, the digital logic may reside on any appropriate device, including switches and bridges, between a source of the data packet and a destination of the data packet. As a result, timestamping may be performed even in cases where third party endpoint devices and networks are used.

Furthermore, because the timestamping is performed in digital logic connected directly to the PCIe bus, the timestamps generated by the digital logic may be more accurate than timestamps generated by a software-based timestamping system. More specifically, in a software-based timestamping system, timestamps are generated at a microprocessor that is farther from the source of an event being timestamped than the digital logic. For example, the microprocessor is often not connected directly to the PCIe bus. This may result in increased latency and timing variability, which decreases the accuracy of timestamps generated by the software. In addition, in a software-based system, timestamping may be dependent on the current load of the microprocessor executing the software, which may delay interrupt processing. This may also adversely affect the accuracy of the timestamps generated.

The example timestamping system includes digital logic configured—for example programmed, designed, located, and/or arranged—to detect a format of a data packet on a packet-oriented bus, and to determine a time at which the data packet was detected. An example data packet includes a unit of data formatted as a single package for transmission across an electronic medium. An example data packet includes a header, which contains fields specifying addresses of the source of the data packet and of the destination of the data packet. An example data packet also includes a payload, which comprises data representing content transmitted by the packet.

In an example, the digital logic may detect that a data packet is a write packet that triggers or produces an interrupt for a microprocessor by writing to a specified address or range of addresses assigned to the microprocessor. The digital logic is also configured to generate, upon receipt of the write packet, a timestamp report containing the time. The timestamp report may be or include several bytes of data representing the time. The timestamp report may be or include a timestamp data packet containing a payload representing the time. The digital logic is configured to output the timestamp report to one or more other devices. In some PCIe implementations, the digital logic is located on the root complex, which may be between the source and destination of a data packet. In this regard, the source of the data packet is the device that output the data packet and the destination of the data packet is the device to which the data packet is sent. Source and destination addresses are typically included in the data packet header. In example systems where the digital logic resides on a root complex device, the timestamp report is output to the microprocessor over a data bus other than the PCIe bus. This is because, in some cases, the PCIe bus does not extend to the microprocessor. In some implementations, the digital logic is located on a device that is connected to the PCIe bus that is not the root complex. In these cases, the timestamp report is output over the PCIe bus to the microprocessor.

The example techniques are described in the context of a test system. However, the techniques are not limited to use with the test system or to a testing context in general. The techniques may be used in any appropriate electronic system that uses a data bus, including a packet-oriented bus, such as PCIe, to carry data.

Test systems are configured to test the operation of electronic devices, such as processing devices and memory chips. Testing may include sending signals to a device and determining how the device reacts to those signals based on the device's response. The device's reaction will dictate whether the device has passed or failed testing. An example of a test system includes automatic test equipment (ATE).

FIG. 1 shows components of example ATE 10. In FIG. 1, the dashed lines represent, conceptually, potential signal paths between devices, including those described below. ATE 10 includes a test head 11 and a test computer 12. Test head 11 interfaces to devices under test (DUTs) (not shown)

on which tests are to be performed. Test computer 12 communicates with test head 11 to control testing operations. For example, the test computer may download test program sets to test instruments located on the test head. The test instruments then run the test program sets to test DUTs in communication with the test head.

ATE 10 includes test instruments 13A to 13N (N>3). Examples of test instruments include, but are not limited to, digital test instruments, serial digital test instruments, alternating current (AC) source test instruments, direct current (DC) voltage/current (V/I) test instruments, and power supply test instruments. Components included in one or more of these test instruments may transmit digital data over a packet-oriented bus, such as PCIe, having the example architecture shown in FIG. 2.

In the example of FIG. 1, the test instruments are housed in the test head. Each test instrument may be housed in a separate slot in the test head. In some implementations, the test instruments are modular. For example, one test instrument may be replaced with a different test instrument that performs a different function or the same function, without replacing other test instruments. Each test instrument may be configured to output test signals to test a DUT, and to receive signals from the DUT. The signals may be digital, analog, wireless, or wired, for example. The signals received may include response signals that are based on the test signals, signals that originate from the DUT that are not prompted by (e.g., that are not in response to) test signals, or both types of these signals.

ATE 10 includes a connection interface 14, which connects test instrument outputs 15 to DIB 16. The connections may be made, for example, using an Institute of Electrical and Electronics Engineers (IEEE) 1394 bus that runs between the test instruments and the DIB. Connection interface 14 may include connectors 20 or other devices for routing signals between the test instruments and DIB 16. For example, the connection interface may include one or more circuit boards or other substrates on which such connectors are mounted. Other types of connections may be used.

DIB 16 connects, electrically, optically, and/or mechanically, to test head 11. DIB 16 includes test sites 21, which may include pins, traces, or other points of electrical, optical, and/or mechanical connection to which DUTs, also called units under test (UUTs), connect. Test signals, response signals, and other signals pass over the test sites between the DUT and test instruments. DIB 16 also may include, for example, connectors, conductive traces, circuitry, or some combination thereof for routing signals between the test instruments and the DUTs.

Figure 2:
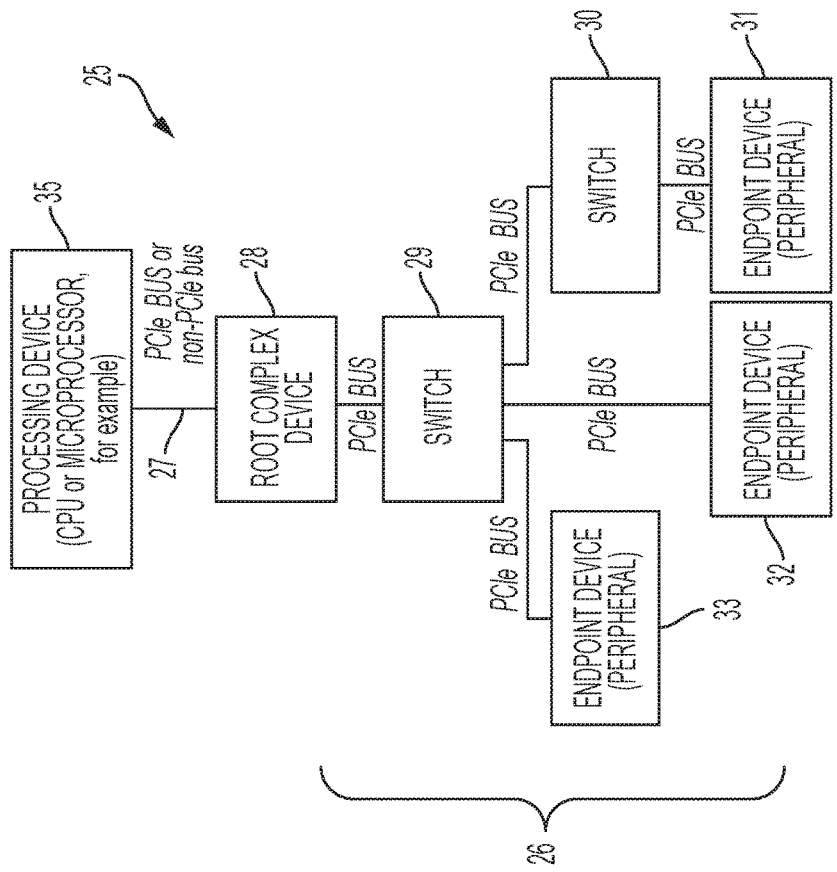
FIG. 2 is a block diagram of an example PCIe bus architecture.

In this example, an instrument, such as instrument 13A includes example architecture 25 shown in FIG. 2. Architecture 25 includes a PCIe 26 bus connecting devices 28, 29, 30, 31, 32, and 33. That is, each of devices 28, 29, 30, 31, 32, and 33 is directly connected to the PCIe bus. As explained above, PCIe is a serial bus that includes, among other things, a switch fabric to control point-to-point serial connections between devices. In this example, the switch fabric includes switches 29 and 30. The switches include hardware devices that are configured—for example programmed, designed, located, and/or arranged—to connect two or more devices connected to the PCIe bus to enable the devices to communicate with each other. In PCIe and other packet-oriented buses, communication includes sending and receiving data packets.

PCIe also includes a root complex device to connect a processing device and memory subsystem to the PCIe switch fabric. The root complex device is also referred to simply as the "root complex". The root complex device is on a communication path between one or more PCIe endpoint devices and a processing device 35. In this example, the root complex device is device 28. In this example, the root complex device includes hardware to connect processing device 35 and memory subsystem to the PCIe switch fabric. In some implementations, this hardware is configured to generate transaction requests on behalf of the processing device. The root complex may be implemented using a discrete device, such as a field programmable gate array (FPGA), or non-programmable logic gates on an application-specific integrated circuit (ASIC). In some implementations, the root complex may be integrated with the processing device; for example, incorporated into the processing device. The root complex may include multiple PCIe ports, to which other PCIe devices may connect.

In some implementations, root complex device 28 is connected to processing device 35 by a local bus 27 that is not a PCIe bus. For example, the local bus may include a serial or parallel data bus that carries data between the processing device and the root complex deivce. In some implementations, root complex device 28 is connected to processing device 35 by the PCIe bus. In some implementations, processing device 35 includes one or more microprocessors, one or more central processing units (CPU), programmable logic, or other circuitry configured to implement or to control one or more aspects of testing on the test instrument. For example, processing device 35 may be configured—for example, programmed—with instructions to implement structural tests, functional tests, or both structural and functional tests on a DUT. A structural test includes performing component-level testing on the device. A functional test includes performing system-level testing on the device. An example functional test includes providing an input—such as a stimulus signal—to the DUT, obtaining an output from the DUT based on the input, and determining whether the device has passed the functional test based on the output. For example, the output may be compared to one or more metrics by the processing device. If the comparison indicates that the DUT's output is within an acceptable range, the DUT passes testing. Otherwise, the DUT fails. In a functional test, multiple outputs may be obtained from the same DUT and compared to one or more metrics as part of the testing process.

Architecture 25 also includes PCIe endpoint devices 31, 32, and 33. PCIe endpoint devices are also referred to as peripherals. The PCIe endpoint devices include hardware devices that constitute termination points of the PCIe bus. The PCIe endpoint devices are configured to communicate with each other and with processing device 35 over the PCIe bus via the switches and, in some cases, via the root complex device. Examples of PCIe endpoint devices include interface devices, or bridges, between the PCIe bus and another data bus that carries communications external to the PCIe architecture—for example, external to the test instrument. In a testing context, for example, the PCIe endpoint devices may be along a communication path to a device or unit under test. For example, the PCIe endpoint devices may translate communications from a protocol in which the DUT communicates to the protocol supported by PCIe bus 26. In some implementations, the PCIe endpoint devices may connect directly to the IEEE 1394 bus that runs between the test instrument and the DIB.

In some implementations, the PCIe endpoint devices all interface to the same type of bus. In some implementations, the PCIe endpoint devices interface to different types of buses. In an example, the PCIe endpoint devices interface to the IEEE 1394 bus, which is also referred to as "firewire", "i.link", and "Lynx". In an example, the PCIe endpoint devices interface to a Universal Serial Bus (USB).

The digital logic for generating timestamps is connected directly to the PCIe bus. In some implementations, the digital logic for generating timestamps is included in the root complex device. In some implementations, the digital logic for generating timestamps is included in the root complex device only. The digital logic may be implemented using an FPGA or non-programmable logic gates on an ASIC or other device. In some implementations, the digital logic is included in the root complex device and also in, or distributed across, one or more other devices included in architecture 25. In some implementations, the digital logic is included in, or distributed across, one or more other devices included in architecture 25. For example, the digital logic may be located in one or more switches, in one or more bridges (not shown), in one or more PCIe endpoint devices, or in a combination of the root complex device, one or more switches, and/or one or more PCIe endpoint devices. In implementations, where the digital logic is distributed across more than one device, multiple devices may be configured with instances of the digital logic. Each instance of the digital logic may be configured with full functionality to generate timestamps in response to events either on the device where it resides or on other PCIe bus devices. Examples of events include, but are not limited to, generating, send, or receiving a data packet.

In some implementations, the digital logic is located only in devices between the source of a data packet and the destination of a data packet. For example, in the implementation of FIG. 2, in some examples an instance of the digital logic may be located in root complex device 28, in switch 30, or in switch 29. An instance of the digital logic includes a copy of the digital logic having its full functionality. In some implementations, the digital logic may be distributed across root complex device 28, switch 30, and switch 29. In some implementations, the digital logic is not located in endpoint devices 31, 32, or 33 or in processing device 35. That is, in some implementations, the digital logic is located only in devices that are on a path between a source of the data packet and an destination of the data packet.

Thus, architecture 25 includes PCIe devices comprising a root complex device and PCIe endpoint devices interconnected by switches. In some implementations, the PCIe devices are all managed by software running on processing device 35. The PCIe devices communicate by sending various types of data packets to each other. The data packets identify a destination device and sometimes a location within the destination device. If a data packet's destination device is not an immediate peer, then the data packet is relayed from device to device until the data packet reaches its intended destination. The digital logic may record when a data packet matching certain criteria transited the PCIe bus. As explained, the digital logic is contained within a PCIe device, such as the root complex device, a switch, or an endpoint device. Therefore, in some examples, for timestamping to occur on a PCIe device, a data packet of interest transits through the PCIe device on its way from the packet's source to the packet's destination.

Figure 3:
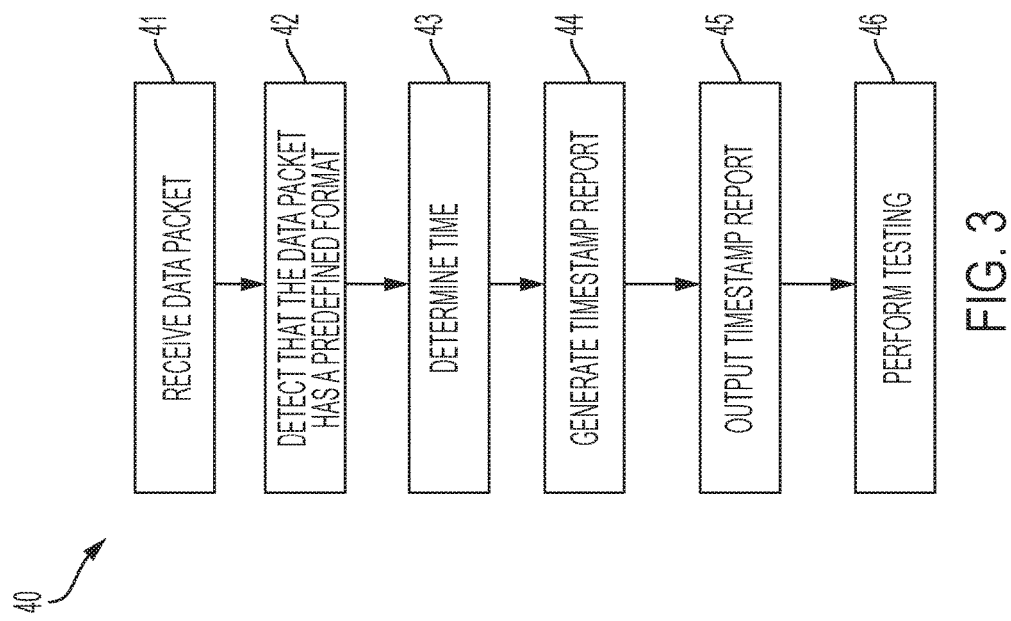
FIG. 3 is a flowchart showing operations performed in an example process for generating timestamps on a packet-oriented bus.

FIG. 3 is a flowchart showing an example process 40 that may be implemented by the digital logic to generate timestamps in response to events on the PCIe bus.

Process 40 includes receiving (41) a data packet at the digital logic. Process 40 includes detecting (42) that the data packet—also referred to as a transaction layer packet (TLP)—from the PCIe bus has a predefined format. For example, the data packet may be configured to write to one or more predefined addresses in a dynamic random access memory (DRAM) of a microprocessor (for example, processing device 35). For example, the data packet may be a write packet configured to write to an address with a range of addresses recognized by the root complex device. For example, the address is within a range of addresses in random access memory (RAM) on processing device 35 that the root complex device recognizes as being for the processing device and to which the root complex device forwards, to the processing device, data packets that the root complex device receives.

Figure 4:
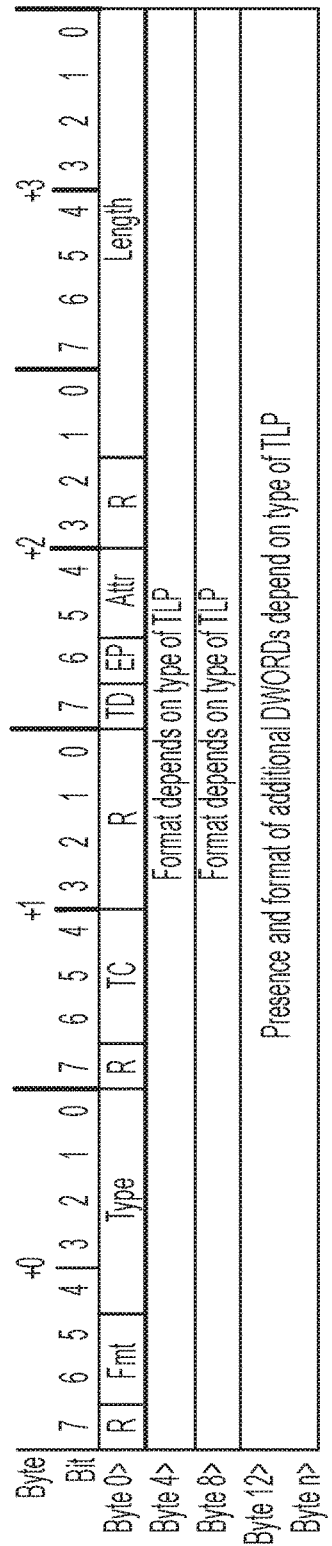
FIG. 4 is a diagram of an example generic PCIe data packet.
Figure 5:
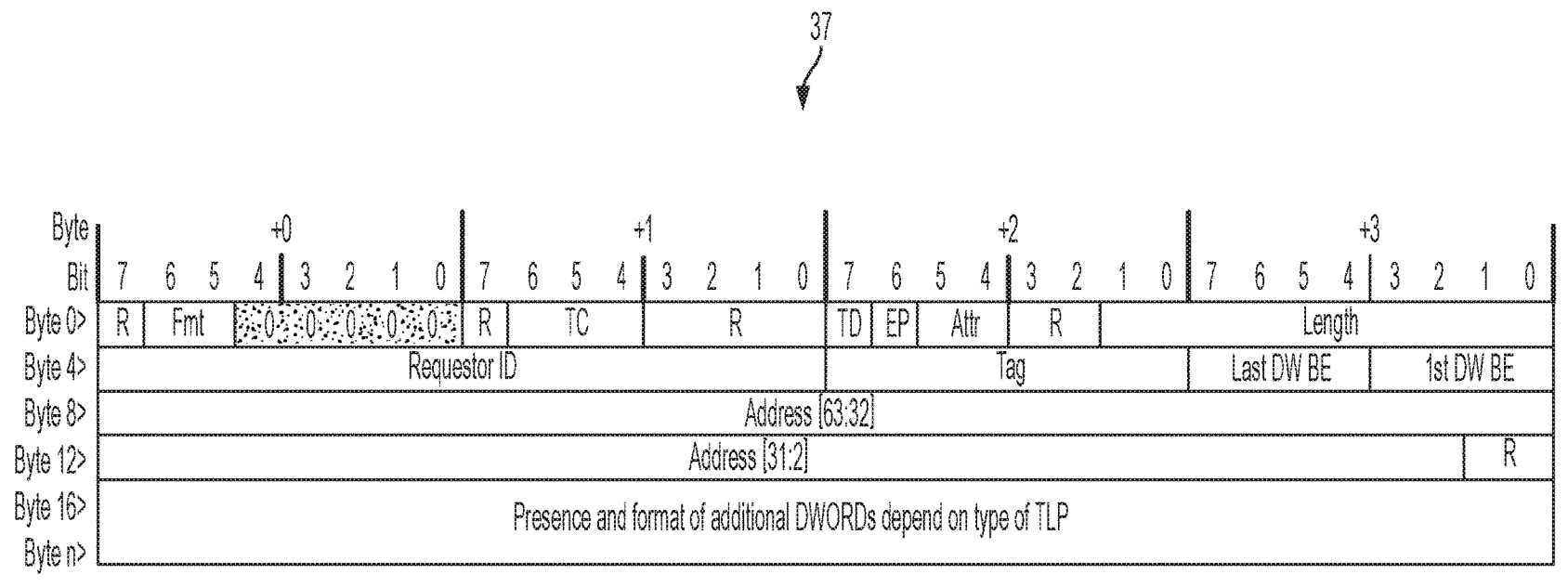
Figure 6:
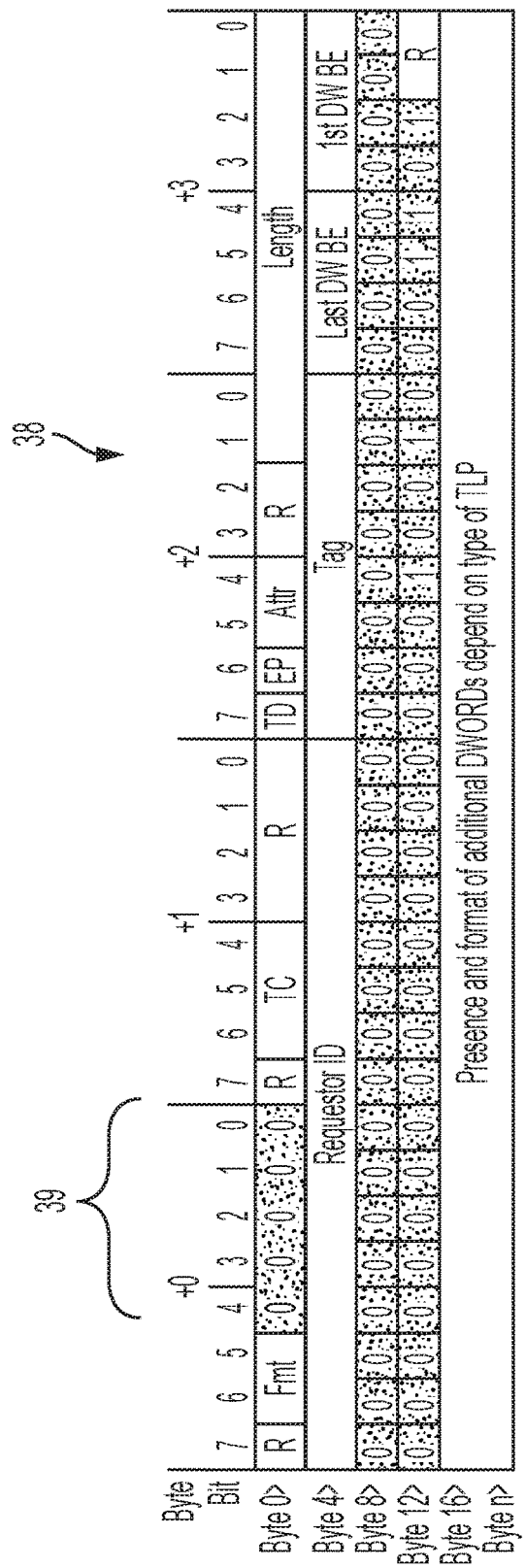
FIG. 6 is a diagram of an example PCIe write packet containing a payload.

FIG. 4 shows an example of a generic data packet 36 that may be transmitted over the PCIe bus. FIG. 5 shows an example of a generic memory write request (MWr) data packet 37 that may be transmitted over the PCIe bus. FIG. 6 shows an example of a specific MWr data packet 38 that has the format to trigger timestamping. In this example, write address 0x1234 39 defines the format that triggers detection (42) by process 40. So, for example, a PCIe endpoint device may be programmed to write to address 0x1234 in the RAM of the processing device. The root complex device recognizes that this 0x1234 address is within a predefined range of addresses for the processing device and generates a timestamp for the data packet. That is, the packet is forwarded from the PCIe endpoint device to the root complex device. Digital logic in the root complex device detects the incoming MWr data packet that has the format and records the time that the data packet was received. The root complex device then forwards the data packet and a timestamp report to processing device 35.

To this end, process 40 includes determining (43) the time at which the data packet was detected. In some implementations, the digital logic includes a clock circuit that tracks and maintains the current time that is used for timestamping. The clock circuit may include a counter that is advanced by a clock signal. In some implementations, a clock on the PCIe bus may be used for timestamping. For example, the PCIe bus includes a native clock signal. This native clock signal is a digital signal that oscillates between two digital states at a constant frequency. This native clock signal may be used as the input to the clock circuit or it may be used to keep track of absolute or relative time for timestamping purposes. Accordingly, in some examples, the digital logic may reference the clock circuit or the native clock signal on the PCIe bus to determine the time at which the data packet was detected.

Process 40 includes generating (44) a timestamp report containing data representing the time at which the data packet was detected. The timestamp report may be or include several bytes of data representing the time of detection. The timestamp report may be or include a timestamp data packet containing a payload representing the time. The timestamp report may contain a destination address corresponding to processing device 35—for example, a microprocessor or a CPU.

Process 40 outputs (45) the timestamp report. For example, if the timestamp report was generated on a PCIe device, the timestamp report is output over the PCIe bus. For example, if the timestamp report is generated on the root complex device, the timestamp report is output over the bus—for example, a non-PCIe bus—that connects processing device 35 and root complex device 28.

In a first example, PCIe device 33 interrupts (e.g., signals or notifies) the software running on a CPU by issuing a specially formatted TLP to write an interrupt register inside root complex device 28. The digital logic in root complex device 28 detects and records the time at which the interrupt TLP was detected. The time is recorded in memory as a timestamp report. A query is issued for the timestamp report by the software running in the CPU while the software is processing a subsequent interrupt. In response, the digital logic sends the timestamp report to the CPU.

In a second example, PCIe device 33 issues a TLP to write to memory associated with a CPU. The digital logic in root complex device 28 records the time at which the memory write TLP was detected. Software running on the CPU polls memory associated with the digital logic to determine if there is a new timestamp report. For example, the software polls the digital logic to determine if the timestamp report has changed. If change is indicated, the software queries the digital logic for the updated timestamp report. In response, the digital logic sends the timestamp report to the CPU.

In any case, the processing device (e.g., the CPU) receives the timestamp report and stores the timestamp report in memory. The timestamp report may be used for testing (46) one or more DUTs in communication with one or more of the PCIe endpoint devices. In an example, the processing device may generate a test report containing the times at which data packets were received by a PCIe endpoint device from the DUT. These times may be compared to expected receipt times in order to test (46) timing aspects of the DUT. In an example, timestamp reports may be used to test operation of the instrument itself. For example, operation times of different components of the instrument may be recorded and compared against expected operation times.

The example systems described herein may be implemented using, and/or controlled using, one or more computer systems comprising hardware or a combination of hardware and software. For example, a system like the ones described herein may include various controllers and/or processing devices located at various points in the system to control operation of the automated elements. A central computer may coordinate operation among the various controllers or processing devices. The central computer, controllers, and processing devices may execute various software routines to effect control and coordination of the various automated elements.

The example systems described herein can be implemented or controlled, at least in part, using one or more computer program products, e.g., one or more computer programs tangibly embodied in one or more information test carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing can be performed by one or more programmable processors executing one or more computer programs to perform the functions described herein. All or part of the testing can be implemented using special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any "connection" as used herein may imply a direct physical connection or a wired or wireless connection that includes or does not include intervening components but that nevertheless allows signals to flow between connected components.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method performed on a packet-oriented bus at a point between a source of a data packet and a destination of the data packet, the method comprising:
    detecting a format of the data packet on the packet-oriented bus;
    determining a time at which the data packet was detected;
    generating a timestamp report containing the time, the timestamp report being addressed to a device connected to the packet-oriented bus; and
    outputting the timestamp report to the device;
    wherein detecting, determining, generating, and outputting are performed by digital logic connected to the packet-oriented bus; and
    wherein detecting the format comprises detecting that the data packet is a write packet, the write packet for writing to one or more predefined addresses.

2. The method of claim 1, wherein the device is a microprocessor; and
    wherein the digital logic is located on a second device connected to the packet-oriented bus that is separate from the microprocessor.

3. The method of claim 2, wherein the digital logic is connected to the packet-oriented bus between the microprocessor and a third device that outputs the data packet.

4. The method of claim 1, wherein the device is a microprocessor; and
    wherein receipt of the write packet triggers or produces an interrupt for the microprocessor.

5. A method performed on a packet-oriented bus at a point between a source of a data packet and a destination of the data packet, the method comprising:
    detecting a format of the data packet on the packet-oriented bus;
    determining a time at which the data packet was detected;

generating a timestamp report containing the time, the timestamp report being addressed to a first device connected to the packet-oriented bus; and outputting the timestamp report to the device;

wherein detecting, determining, generating, and outputting are performed by digital logic connected to the packet-oriented bus;

wherein the first device is a microprocessor;

wherein the digital logic is located on a second device connected to the packet-oriented bus that is separate from the microprocessor;

wherein the digital logic is connected to the packet-oriented bus between the microprocessor and a third device that outputs the data packet;

wherein the packet-oriented bus is a peripheral component interconnect express (PCI Express) bus; and wherein the third device interfaces to an IEEE 1394 bus, the IEEE bus being located on a path to a device under test.

6. A method performed on a packet-oriented bus at a point between a source of a data packet and a destination of the data packet, the method comprising:

detecting a format of the data packet on the packet-oriented bus;

determining a time at which the data packet was detected;

generating a timestamp report containing the time, the timestamp report being addressed to a device connected to the packet-oriented bus; and outputting the timestamp report to the device;

wherein detecting, determining, generating, and outputting are performed by digital logic connected to the packet-oriented bus;

wherein the packet-oriented bus is a peripheral component interconnect express (PCI Express) bus; and wherein the digital logic is located at a root complex of the PCI Express bus.

7. A method performed on a packet-oriented bus at a point between a source of a data packet and a destination of the data packet, the method comprising:

detecting a format of the data packet on the packet-oriented bus;

determining a time at which the data packet was detected;

generating a timestamp report containing the time, the timestamp report being addressed to a first device connected to the packet-oriented bus; and outputting the timestamp report to the first device;

wherein detecting, determining, generating, and outputting are performed by digital logic connected to the packet-oriented bus;

wherein the data packet is output from a second device connected to the packet-oriented bus;

wherein the timestamp report is output to memory on the first device; and wherein the timestamp report is used in testing operation a device under test in communication with the second device.

8. The method of claim 6 or 1, wherein the device is a first device;

wherein the data packet is output from a second device connected to the packet-oriented bus to a third device connected to the packet-oriented bus, the digital logic being on a path of the packet-oriented bus between the second device and the third device.

9. The method of claim 8, wherein the first device is a microprocessor.

10. The method of claim 5, 6, 1, or 7, wherein the time is determined by referencing a clock available on the packet-oriented bus.

11. The method of claim 5, 6, 1, or 7, wherein the timestamp report is output over the packet-oriented bus.

12. A system comprising:

a packet-oriented bus;

a first device connected to the packet-oriented bus for outputting a data packet over the packet-oriented bus; and digital logic connected to the packet-oriented bus, the digital logic being configured to perform operations comprising:

detecting a format of the data packet on the packet-oriented bus;

determining a time at which the data packet was detected;

generating a timestamp report containing the time, the timestamp report being addressed to a second device; and outputting the timestamp report to the second device over the packet-oriented bus;

wherein the digital logic is connected to the packet-oriented bus at a point between the first device and a destination of the data packet; and wherein detecting the format comprises detecting that the data packet is a write packet, the write packet for writing to one or more predefined addresses.

13. The system of claim 12, wherein the second device is a microprocessor; and wherein the digital logic is located on a third device connected to the packet-oriented bus that is separate from the microprocessor.

14. The system of claim 13, wherein the third device is connected to the packet-oriented bus between the microprocessor and the first device.

15. The system of claim 12, wherein the second device is a microprocessor; and wherein receipt of the write packet triggers or produces an interrupt for the microprocessor.

16. A system comprising:

a packet-oriented bus;

a first device connected to the packet-oriented bus for outputting a data packet over the packet-oriented bus; and digital logic connected to the packet-oriented bus, the digital logic being configured to perform operations comprising:

detecting a format of the data packet on the packet-oriented bus;

determining a time at which the data packet was detected;

generating a timestamp report containing the time, the timestamp report being addressed to a second device; and outputting the timestamp report to the second device over the packet-oriented bus;

wherein the digital logic is connected to the packet-oriented bus at a point between the first device and a destination of the data packet;

wherein the second device is a microprocessor;

wherein the digital logic is located on a third device connected to the packet-oriented bus that is separate from the microprocessor;

wherein the third device is connected to the packet-oriented bus between the microprocessor and the first device;

wherein the packet-oriented bus is a peripheral component interconnect express (PCI Express) bus; and
wherein the first device interfaces to an IEEE 1394 bus, the IEEE bus being located on a path to a device under test.

17. A system comprising:
a packet-oriented bus;
a first device connected to the packet-oriented bus for outputting a data packet over the packet-oriented bus; and
digital logic connected to the packet-oriented bus, the digital logic being configured to perform operations comprising:
  detecting a format of the data packet on the packet-oriented bus;
  determining a time at which the data packet was detected;
  generating a timestamp report containing the time, the timestamp report being addressed to a second device; and
  outputting the timestamp report to the second device over the packet-oriented bus;
wherein the digital logic is connected to the packet-oriented bus at a point between the first device and a destination of the data packet;
wherein the destination is the second device, the digital logic being on a path of the packet-oriented bus between the first device and the second device.

18. The system of claim 17, wherein the second device is a microprocessor.

19. A system comprising:
a packet-oriented bus;
a first device connected to the packet-oriented bus for outputting a data packet over the packet-oriented bus; and
digital logic connected to the packet-oriented bus, the digital logic being configured to perform operations comprising:
  detecting a format of the data packet on the packet-oriented bus;
  determining a time at which the data packet was detected;
  generating a timestamp report containing the time, the timestamp report being addressed to a second device; and
  outputting the timestamp report to the second device over the packet-oriented bus;
wherein the digital logic is connected to the packet-oriented bus at a point between the first device and a destination of the data packet;
wherein the packet-oriented bus is a peripheral component interconnect express (PCI Express) bus; and
wherein the digital logic is located at a root complex of the PCI Express bus.

20. A system comprising:
a packet-oriented bus;
a first device connected to the packet-oriented bus for outputting a data packet over the packet-oriented bus; and
digital logic connected to the packet-oriented bus, the digital logic being configured to perform operations comprising:
  detecting a format of the data packet on the packet-oriented bus;
  determining a time at which the data packet was detected;
  generating a timestamp report containing the time, the timestamp report being addressed to a second device; and
  outputting the timestamp report to the second device over the packet-oriented bus;
wherein the digital logic is connected to the packet-oriented bus at a point between the first device and a destination of the data packet;
wherein the timestamp report is addressed to memory on the second device; and
wherein the system is part of a test instrument configured to use the timestamp report in testing operation of a device under test in communication with the first device.

21. The system of claim 16, 17, 19, 12, or 20, wherein the time is determined by referencing a clock available on the packet-oriented bus.

22. Automatic test equipment comprising:
a device interface board for interfacing to a device under test;
a test head comprising one or more test instruments, at least one of the test instruments comprising:
  a packet-oriented bus;
  a first device connected to the packet-oriented bus for outputting a data packet over the packet-oriented bus; and
  digital logic connected to the packet-oriented bus, the digital logic being configured to perform operations comprising:
    detecting a format of the data packet on the packet-oriented bus;
    determining a time at which the data packet was detected;
    generating a timestamp report containing the time, the timestamp report being addressed to a second device; and
    outputting the timestamp report to the second device over the packet-oriented bus;
  wherein the digital logic is connected to the packet-oriented bus at a point between the first device and a destination of the data packet; and
a data bus that is different from the packet-oriented bus and that is on a path between the first device and the device interface board.

* * * * *